Dec. 6, 1966 H. BÜHLER 3,289,783
DEVICE FOR CONTROLLING THE SPEED OF RAIL TRAVELING VEHICLES
Filed Oct. 2, 1962 2 Sheets-Sheet 1

INVENTOR.
HANSRUEDI BÜHLER

BY

McGlew & Toren

ATTORNEYS

United States Patent Office 3,289,783
Patented Dec. 6, 1966

3,289,783
DEVICE FOR CONTROLLING THE SPEED OF RAIL TRAVELING VEHICLES
Hansruedi Bühler, Wallisellen, Zurich, Switzerland, assignor to Maschinenfabrik Oerlikon, Zurich, Switzerland
Filed Oct. 2, 1962, Ser. No. 227,910
Claims priority, application Switzerland, Oct. 4, 1961, 11,541/61
2 Claims. (Cl. 180—82.1)

This invention pertains, in general, to systems and apparatus for controlling vehicles; and, in particular, to a system and apparatus for regulating the speed of railway vehicles.

It is necessary to control the speed of railway vehicles, especially when such vehicles are operated by but one person, for the purpose of slowing down the vehicle when it approaches, and as it passes through, a construction area. Often too, for example, the speed of the railway vehicle must be reduced when the vehicle approaches a curved rail section, or track section, and as it passes over the curved track section.

Accordingly, one object of the present invention is to provide a system and means for automatically regulating the speed of a railway vehicle.

Another object of the present invention is to regulate the speed of railway vehicles with means which are relatively simple, highly reliable and economical.

According to one illustrative embodiment of the present invention, there are provided in a section of rail (which may be the conventional double-rail track or a monorail) two actuators which are spaced a predetermined distance from each other. Within the vehicle, there is contained an electrical network, adapted to be actuated as the vehicle passes over the two spaced-apart actuators, for the purpose of regulating the vehicle speed. The circuitry within the vehicle is comprised of two multivibrators, the output signals of which are adapted to be changed from one condition to another, when the vehicle passes over the two track-situated actuators. Output signals from the multivibrators are fed to a logic circuit (for example, an AND circuit) which, if it simultaneously receives signals from both multivibrators within a predetermined duration of time, provides an output signal which may be used to actuate alarm means and/or means for braking the vehicle. Being spaced apart a fixed distance on the track, the two actuators in effect set the maximum permissible speed of the travelling vehicle. For example, if they are spaced a mile apart and if both track actuators were actuated in sequence within a period of one minute, then the vehicle would be travelling at a speed greater than 60 miles per hour, and the AND circuit would receive from the track actuated multivibrators two signals within such predetermined duration of time, thereby conditioning the AND circuit to provide an output control signal for the alarming the operator of the vehicle and/or for automatically actuating braking means. In actual practice, the measuring interval or predetermined duration of time may be set to be very short, such as a period of a few seconds or a few microseconds. In such case the track actuators can be spaced relatively close to each other such as being spaced apart a distance of the order of only a few feet or less.

The tripping arrangement may comprise a pair of fixed actuators, spaced a predetermined distance along a track, and cooperable with a single input means on the vehicle to provide two signals, one as the vehicle passes the first track device and the second as the vehicle passes the second track device. Alternatively, a trackside actuating means at a single location can be provided, and two pickup means may be provided on the vehicle in longitudinally spaced relation. Thus, one signal will be provided as the first pickup means passes the trackside device and the second signal will be provided as the second pickup means passes the trackside device. It will be appreciated that both arrangements are the equivalent of each other. It should further be understood that the control arrangement may be oriented as to direction of travel as it may be desirable to restrict traffic in one direction to one predetermined speed limit, while not so restricting traffic moving in the opposite direction.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
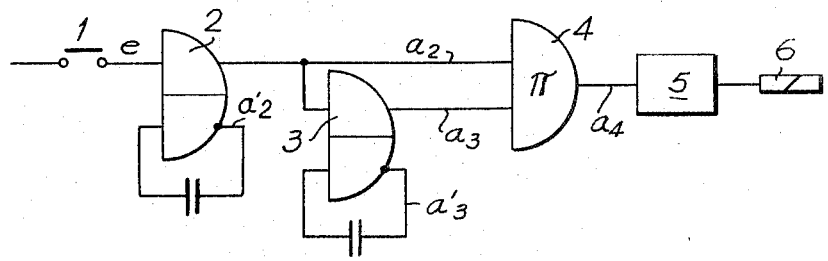
FIG. 1 is a block diagram of the control circuit according to one embodiment of the invention.
Figure 7:
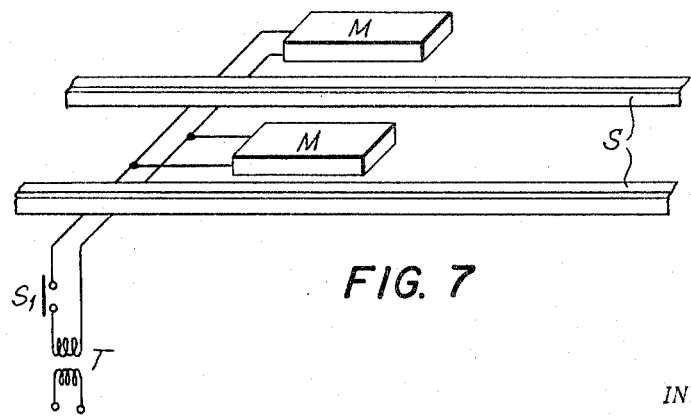
FIG. 7 is a somewhat schematic perspective view of one form of track-side actuating means useful with the invention.

In FIG. 1 the contact 1 closes as the vehicle passes over a first track-situated actuator, such as, for example, an excited electromagnet, such as the magnets M of FIG. 7, one of which is located between rails S and the other of which is located immediately outside of a rail S, with both magnets being energized from a transformer T through closure of a switch $S_1$. Two mono-stable multivibrators 2 and 3 are, as shown, coupled with an AND gate 4. The output from the AND gate 4 is fed into an actuating means 5 which, in turn, provides an actuating signal to an alarm 6. (Instead of, or coupled in parallel with, the alarm device 6, there may be an electrically operated braking mechanism.) The components 2, 3 and 4 constitute a time-dependent switching arrangement effective to provide an actuating signal to the element 5 if the speed of the vehicle exceeds a predetermined value.

Figure 2:
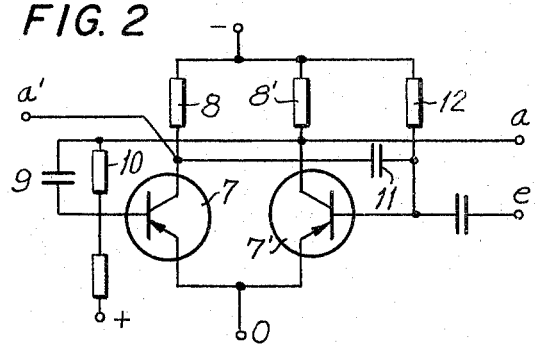
FIG. 2 is a schematic diagram of a mono-stable multivibrator circuit representative of those employed in the embodiment of the invention shown at FIGS. 1 and 4.

In order to more fully explain the operation of the control circuit shown in FIG. 1, it will be helpful at this point to discuss the operation of the multi-vibrators 2 and 3. FIG. 2 illustrates, schematically, the circuitry of a monostable multivibrator which is employed in FIGS. 1 and 4; i.e., the multivibrator circuit of FIG. 2 being employed for the monostable multivibrators indicated symbolically in FIGS. 1 and 4, in accordance with the discussion hereinafter appearing. The monostable multivibrators 2 and 3, each of which has the configuration illustrated in FIG. 2, are further shown schematically in FIG. 5 which is a wiring diagram corresponding to a combination of the block diagrams of FIGS. 1, 2, and 3.

Figure 5:
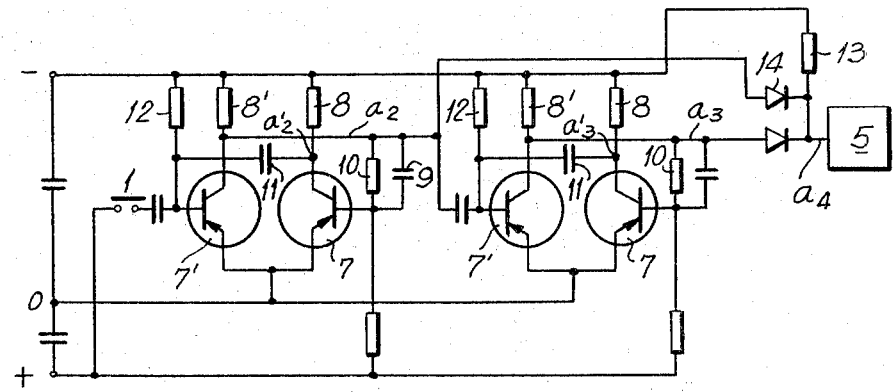
FIG. 5 is a schematic wiring diagram corresponding to a combination of the block diagrams of FIGS. 1, 2 and 3.

Referring to FIGS. 2 and 5, two transistors 7 and 7' have their emitters commonly connected to a terminal O representing a source of neutral potential. The collectors of the two transistors are commonly connected, each through a respective series connected resistor 8 or 8', to a terminal which is at a negative potential. As may be appreciated by referring to FIG. 2, the collector of transistor 7' is connected to the base of transistor 7 by the parallel connected resistance 10 and capacitor 9. However, the collector of transistor 7 is coupled to the base of the transistor 7' through the capacitor 11. Thus, the cross-coupling between the respective collectors and bases of the transistors 7 and 7' is nonsymmetrical. Normally (when the circuitry of FIG. 1 has not been activated by the track actuator), the transistor 7' (FIGS. 2 and 5) is the only one that is conductive. This transistor 7' can, however, be blocked by introducing a sufficiently positive voltage pulse at terminal $e$ (FIGS. 2 and 5). When such a positive voltage pulse is introduced, the transistor 7 then becomes conductive by virtue of the coupling circuit defined by the resistor 10 and the capacitor 9. Thereupon, the capacitor 11 becomes charged, so that, after a certain predetermined duration of time, the monostable multivibrator circuitry shown at FIG. 2 can return to its normal condition; i.e. transistor 7 is nonconductive and transistor 7' is conductive.

More specifically, with reference to FIG. 2, the normal situation of the monostable multivibrator shown in FIG. 2 is such that the potential at terminal $a$ equals 0 (i.e. a neutral potential), whereas the potential at terminal $a'$ is 1 wherein 1 is a negative potential with respect to the potential at terminal $a$. Thus, a positive voltage potential pulse at terminal $e$, occasioned by the closing of the contact 1, impresses a positive potential at that terminal which is the input to the monostable multivibrator 2. The positive potential introduced at terminal $e$ occasions a change in the multivibrator attitude such that there is produced at the terminal $a$, a predetermined negative potential 1 and at terminal $a'$ a predetermined higher neutral potential 0. After a definite time duration which is determined by the respective values of the capacitor 11 and of the resistance element 12, the multivibrator shown at FIG. 2 is restored to its initial condition; i.e. terminal $a$ becomes fixed at a neutral potential 0 and the terminal $a'$ becomes fixed at its initial predetermined negative potential 1.

With reference to FIG. 5, the normal situation of the monostable multivibrators 2 and 3 is such that the potential at terminals $a_2$ and $a_3$ equals 0 whereas the potential at $a'_2$ and $a'_3$ equals 1.

The function of the monostable multivibrators 2 and 3 illustrated schematically in FIGS. 2 and 5 and just described, is well known. (See, for example, the Department of the Army Technical Manual TM 11–690, entitled "Basic Theory and Application of Transistors," available from the Superintendent of Documents, U.S. Government Printing Office, Washington 25, D.C., United States of America. See particularly pages 181–201.)

Figure 3:
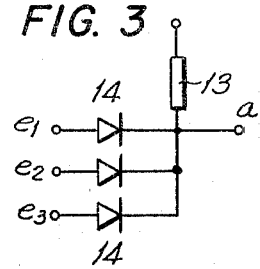
FIG. 3 is a schematic diagram of a typical AND gate.

FIG. 3 is a schematic illustration of a conventional AND gate shown, solely by way of example, as having three inputs, although such AND gates may have two or more than three inputs. In particular, the AND gate 4 of FIGS. 1 and 4, and the AND gate 17 of FIG. 4, have only two inputs. The AND gate shown in FIG. 3 comprises three diodes 14 having their cathodes connected in parallel to one terminal of a resistance 13 and to an output terminal $a$. The anodes of diodes 14 are connected to respective input terminals $e_1$, $e_2$ and $e_3$. While the operation of such an AND gate is well known, it is desired to observe that a signal or a pulse will be obtained at the output terminal $a$ only if identical signals or pulses are applied simultaneously to all of the inputs, such as to each of the inputs $e_1$, $e_2$ and $e_3$ of FIG. 3. Thus, if a potential 0, a neutral potential with respect to these at $e_2$ and $e_3$, is applied at only one of the inputs, for example, at input $e_1$, current flows through resistor 13 and the potential at output terminal $a$ is a neutral potential or 0. However, if the same negative potential 1 is applied simultaneously to all three inputs $e$, the signal at output terminal $a$ will be 1, which is a negative potential.

As long as the contact 1 (actuated by the track electromagnetic device) is open, the following conditions apply with respect to the configuration illustrated in FIGS. 1 and 5: $a_2$ equal 0, $a'_2$ equals 1, $a_3$ equals 0, $a'_3$ equals 1, and $a_4$, which is the output of AND circuit 4, equals 0.

However, when the traversed device causes the contact 1 to close, momentarily, the electric potential conditions in the configurations illustrated in FIGS. 1 and 5 are as follows: $a_2$ equals 1, $a'_2$ equals 0, $a_3$ equals 0, $a'_3$ equals 1, and $a_4$ equals 0. Accordingly, the monostable multivibrator 2 (FIG. 1) has its electric potential at the terminals, hereinbefore mentioned, changed, but the monostable multivibrator 3 is not influenced by the closure of contact 1, as the potential at terminal $a_2$ has changed from 0 to 1. However, when the monostable multivibrator 2, being a relaxation device, changes back into its normal condition after about, for example, one millisecond, a more positive voltage pulse is fed to the multivibrator 3. Under these conditions, $a_2$ becomes 0, $a'_2$ becomes 1, $a_3$ becomes 1, $a'_3$ becomes 0, and thus $a_4$ supplies a neutral potential pulse 0 to the input of control element 5. Multivibrator 3 remains about 2 seconds, for example, in the state $a_3=1$, $a'_3=0$.

As stated, either a second electromagnetic device is situated along the track at a predetermined distance from the first electromagnetic device, or a pair of longitudinally spaced pickup devices are provided on the vehicle cooperating with magnets M at a fixed position along the rails S. The distance between the spaced apart devices, whether they are track-side or whether they are vehicle carried, measures the time interval between the two input signals and thus is a measure of the vehicle speed as it measures the time required for the vehicle to traverse the distance between the two spaced apart devices, whether trackside or vehicle carried.

FIG. 7 illustrates a single pair of actuating devices M, one of which is positioned between the rails S and the other of which is positioned outside the rails S. In actual operation, with the fixedly positioned actuators shown in FIG. 7, there would be a second pair of similarly located actuators M located a predetermined distance longitudinally from the illustrated pair. However, one of the magnets M as illustrated in FIG. 7 plus an additional magnet M spaced longitudinally therefrom can be sufficient in many cases. Generally, a rail vehicle carries two sensing elements, one element being used for one direction of travel and the other being used for the other direction of travel. Thus, one element would cooperate with the magnets located between the rails S and the other element would cooperate with the magnets located outside the rails S. Alternatively, and as stated, the vehicle could carry the actuating devices in longitudinally spaced relation thereon.

It will be appreciated that, corresponding to the direction of travel of the vehicle, one of the actuating devices, whether mounted between or outside the rails or whether carried by the vehicle, would be the "leading" actuator and the other would be the "trailing" actuator, the "trailing" actuator being spaced a predetermined distance longitudinally from the "leading" actuating device.

If contact 1 of FIGS. 1 and 5 is closed a second time, this time by the trailing actuating device, the state of multi-vibrator 2 is changed again so that $a_2=1$ and $a'_2=0$. In the event that the second closing contact 1 occurs after a time greater than the time constant of two seconds of multivibrator 3, which means that the vehicle speed in traversing the distance between the leading and trailing actuating device is not above the maximum permissible speed, multivibrator 3 will have already returned to its stable state wherein $a_3$ equals 0. With $a_3=0$ and $a_2=1$, AND gate 4 will not be opened and no signal is supplied to actuator 5 and thus the warning or speed control device 6 will not be operated.

If the vehicle speed, in traversing the predetermined longitudinal distance separating the leading and trailing actuators exceeds the maximum predetermined or permissible speed, contact 1 of FIGS. 1 and 5 will close the second time before multivibrator 3 returns to its normal position. Under these conditions, $a_3$ will equal 1 and $a'_3$ will equal 0. Also, due to the flipping of multivibrator 2, $a_2$ will equal 1 and $a'_3$ will equal 0. With $a_2$ and $a_3$ each supplying a negative potential 1 to the respective inputs of AND gate 4 the gate will be opened and negative potential will appear at output 4 and be supplied to actuator 5. This will cause operation of the element or means 6 which may be a warning device such as a bell or horn or the like, or a vehicle speed controlling device, such as a braking device.

Figure 4:
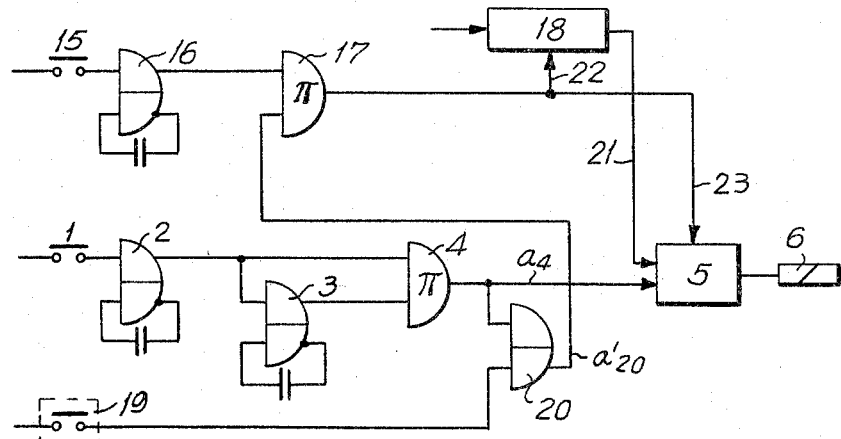
FIG. 4 is a block diagram of the control circuit of the invention as embodied in another arrangement.
Figure 6:
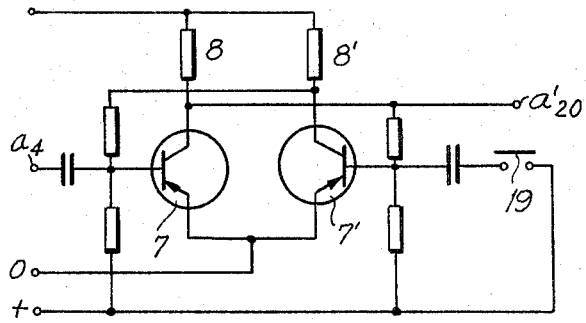
FIG. 6 is a schematic wiring diagram of a portion of the block diagram of FIG. 4.

In FIGS. 4 and 6, there is illustrated, schematically, another embodiment of the present invention which is applicable to a vehicle operated by but one person. (As far as possible, like elements as illustrated at FIG. 1 and further illustrated schematically at FIGS. 2 and 3, have been employed in the arrangement shown in FIG. 4.) As stated, FIG. 6 is a schematic wiring diagram of certain elements shown in block form in FIG. 4.

As shown, a "dead man" contact 15 is serially coupled with a monstable multivibrator 16. Also serially coupled with the monostable multivibrator 16 there is an AND gate 17 (see FIGS. 3 and 5). The output of the AND gate 17 is coupled, in parallel, to a counter 18 through the connection 22 and to an actuator 5 through the connection 23. The output from the counter is fed via path 21 into the actuator 5, which is, in turn, serially coupled with the control device 6. In addition, the contact 1 is serially coupled with the monostable multivibrator 2 which is coupled with the mono-stable multivibrator 3 which is, in turn, coupled with the AND gate 4; the AND gate 4 being directly coupled with the actuator 5 and element 6, as hereinbefore described with reference to discussion of FIGS. 1 and 5. There is an additional sealed switch 19 serially coupled into another multivibrator 20, which is a bistable multivibrator shown in the schematic wiring diagram of FIG. 6. Multivibrator 20, being bistable, has two stable conditions: each of the input pulses being operative to switch the bistable multivibrator 20 from one stable position to another stable position.

The conditions of the several devices, and particularly of the multivibrators 2 and 3 and the AND gate 4, will be clarified from the following table:

a weight on the handle for its deactivation. On the other hand, there is always the possibility that the hand of an operator, who has become unconscious, continues to press the handle, resulting again in a deactivation of the safety system. In order to avoid these drawbacks, several systems are in use, and a known system to which the invention as illustrated in FIGS. 4 and 6 may be applied, operates generally as follows.

The operator must, during predetermined intervals, press the dead man's handle. Too long an interval of such pressing, as well as too long an interval between the operator's pressing the handle, triggers the safety system. In either case, the operator is warned, shortly after termination of the predetermined time limit, by a buzzer or the like. The buzzer signal is produced in dependence on the distance travelled, as measured by the counter 18, for example.

Referring now again to FIG. 4, the part thereof corresponding to the arrangement of FIGS. 1 and 5 operates in the same manner as described, its operation being triggered by the closing of contact 1 by a trackside actuating device.

Thus, under normal condtions such as exist at correct vehicle speed, the output of AND gate 4 at $a_4=0$. The normal state of bistable multivibrator 20 is such that $a'_{20}=1$. When contact 15 is closed by pressing the deadman's handle, an output pulse 1 produced by monostable multivibrator 16 is gated by AND gate 17 as both its inputs are at 1, thereby resetting counter 18 and deactivating actuating mechanism 5.

If the maximum permissible speed is being exceeded, AND gate 4 gates a pulse, in the same manner as described with respect to FIGS. 1 and 5, thus rendering $a_4=1$. As a result, bistable multivibrator 20 changes state so that its output $a'_{20}$ equals 0. With this output at $a'_{20}$, AND gate 17 is blocked. Consequently, pressing the "dead man's handle" is of no avail to deactivate the actuating mechanism 5, and the vehicle is braked. Under such conditions, actuating mechanism 5 can be deactivated only by closing the sealed switch 19. By closing switch 19, a positive signal (see FIG. 6) is applied to bistable multivibrator 20, changing its state so that

| Sequence of Events | Multivibrator 2 | | Multivibrator 3 | | AND gate 4 |
|---|---|---|---|---|---|
| | $a_2$ | $a'_2$ | $a_3$ | $a'_3$ | $a_4 = a_2 \cdot a_3$ |
| Contact 1 open | 0 | 1 | 0 | 1 | 0 |
| Contact 1 closes momentarily | 1 | 0 | 0 (No change here) | 1 | 0 |
| After time lapse of 1 ms | 0 | 1 | 1 | 0 | 0 |
| Contact 1 closes second time momentarily within less than 2s | 1 | 0 | 1 | 0 | 1 Speed too high. |
| Contact 1 closes second time momentarily after more than 2s | 1 | 0 | 0 | 1 | 0 Speed all right. |

The term "dead man" contact as used hereinabove refers to a somewhat complicated safety system used on traction vehicles operated by only one person, and which system serves to brake and bring to a halt the vehicle when the vehicle operator, either as a result of illness or neglect of duty, is no longer in control of the vehicle. Such a safety system, includes a handle, known as the "dead man's handle" which is to be pressed down by the operator's hand. If the operator releases the handle, the current supply to the motors is interrupted and the vehicle brakes are applied.

However, the necessity for the operator to press the handle continuously is rather tiresome on the operator, and has led to irregularities such as the operator placing $a'_{20}=1$. Thus, AND gate 17 is opened again and counter 18 is reset. In order to operate this switch 19, to regain control of the vehicle and cancel to regain control the operator has to break its seal to regain control. However, the operator will have to report the breaking of the seal of switch 19, thereby admitting that he has exceeded the speed described for the path of travel in question.

While specific embodiments of the invention have been shown and described in detail to illustrate the application of the inventive principles, it will be understood that the invention may be embodied otherwise without departing from such principles.

What is claimed is:
1. Apparatus for controlling the speed of a vehicle along a path of travel comprising, in combination, switch means carried by the vehicle; two detector means, one carried by the vehicle and the other fixedly positioned along said path; one detector means comprising a pair of actuator elements spaced apart a predetermined distance longitudinally of the path of travel, and the other detector means comprising a single actuator element sequentially cooperable with said spaced apart actuator elements to operate said switch means twice as the vehicle travels said predetermined distance; electronic timing means, including monostable multivibrator means, carried by the vehicle and responsive to operation of said switch means; actuating means on the vehicle controlling, when activated, a vehicle speed regulating means; and an AND gate providing an output signal to said actuating means to activate the latter, responsive to said switch means being so operated twice within a time interval determined the time characteristics of said monostable multivibrator means.

2. In apparatus for controlling the speed of the vehicle along a path of travel and of the type including switch means carried by the vehicle and two detector means, one carried by the vehicle and the other fixedly positioned along the path, with one detector means comprising a pair of actuator elements spaced apart a predetermined distance longitudinally of the path of travel, and the other detector means comprising a single actuator element sequentially cooperable with the spaced apart actuator elements to operate the switch means twice as the vehicle travels the predetermined distance; the improvement comprising electronic timing means, including monostable multivibrator means, carried by the vehicle and responsive to operation of the switch means; actuating means on the vehicle controlling, when activated, a vehicle speed regulating means; and an AND gate providing an output signal to said actuating means, to activate the latter, responsive to said switch means being so operated twice within a time interval determined by the time characteristics of said monostable multivibrator means.

References Cited by the Examiner
UNITED STATES PATENTS
2,291,372  7/1942  Bushnell _____ 246—63

ARTHUR L. LA POINT, *Primary Examiner.*
LEO QUACKENBUSH, *Examiner.*
S. T. KRAWCZEWICZ, *Assistant Examiner.*